Jan. 23, 1968     J. N. DAVIS ET AL     3,365,540
CABLE HOLDER
Filed April 21, 1966
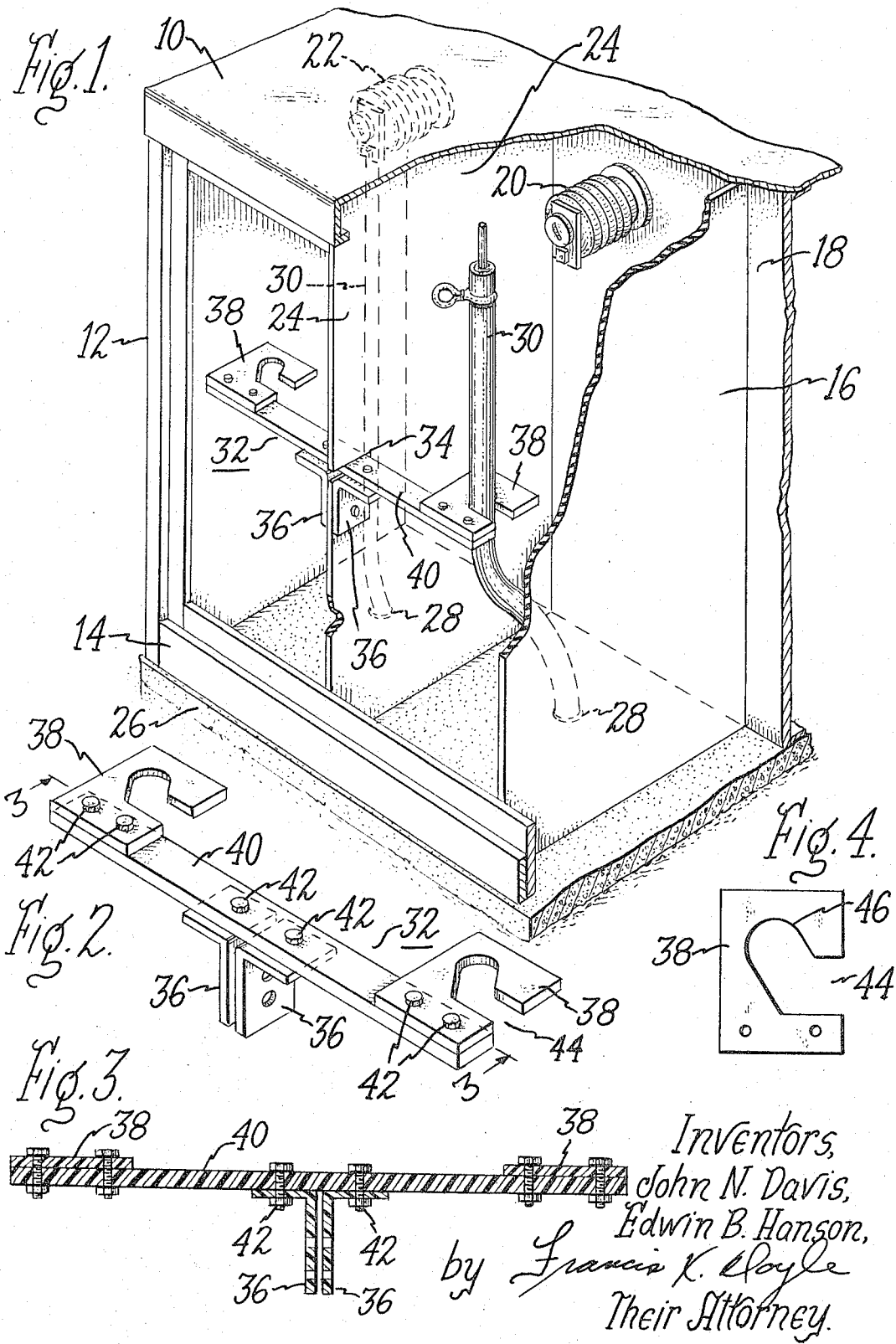
Inventors,
John N. Davis,
Edwin B. Hanson,
by Francis K. Doyle
Their Attorney.

United States Patent Office 3,365,540
Patented Jan. 23, 1968

3,365,540
CABLE HOLDER
John N. Davis, Pittsfield, Mass., and Edwin B. Hanson, Berkeley, Calif., assignors to General Electric Company, a corporation of New York
Filed Apr. 21, 1966, Ser. No. 544,284
1 Claim. (Cl. 174—138)

ABSTRACT OF THE DISCLOSURE

A cable holder for holding a disconnected cable clear of metal parts in an electrical apparatus, such as a transformer. The cable holder is an insulated bar member having on at least one end, a slotted hook shaped opening into which a disconnected cable may be placed. The insulated bar member is secured to a portion of the electrical apparatus in a position to hold the end of the disconnected cable clear of any metal parts in the electrical apparatus.

---

This invention relates to cable holders and more particularly to an energized cable holder for use in transformers.

As is well understood by those skilled in the transformer art, in the servicing of transformers it is often necessary, or at least desirable, to disconnect the high voltage cables from such transformers. After such cables have been disconnected there is always a problem of placing such cables in a position where they cannot contact metal parts of the transformer nor be accidentally contacted by a workman or serviceman working on such transformer. In many instances it is possible for two men to work at servicing a transformer and one man may handle the energized cables while the other may perform the necessary services. However, it is considered desirable that one man be able to perform the majority of services on transformers, due to the cost factors and also problems of shortages of adequately trained personnel.

As will be understood, where a single man is used in servicing transformers it is necessary that the high voltage cable be properly secured. In many instances the high voltage cable may be energized and it is necessary for safety purposes of the serviceman to positively secure the high voltage disconnected cable in a manner so as to be clear of all metal parts of the transformer and also in a manner so as not to be accidentally contacted by the workmen. Thus there is a need for a device which will hold high voltage cables in a safe and secure manner when such cables have been disconnected from a transformer.

Therefore, it is an object of this invention to provide a cable holder for the disconnected cables of a transformer.

A further object of the invention is to provide an insulated cable holder which may be mounted in a transformer for holding disconnected cables clear of the metal parts of the transformer.

A still further object of this invention is to provide an insulated cable holder having a plurality of cable holding members which will positively secure disconnected cables clear from all metal parts of the transformer and out of accidental contact by a serviceman.

In carrying out this invention in one form an insulated member is provided, adapted to be secured to an insulating barrier or other member between the high voltage terminals of a transformer. The insulated member is provided with at least one hook-shaped portion into which a disconnected high voltage cable may be placed. The insulated member is mounted so as to hold the disconnected cable clear of all metal parts of the transformer.

The invention which is sought to be protected will be clearly pointed out and distinctly claimed in the claims appended hereto. However, it is believed that this invention and the manner in which its objects and advantages are obtained, as well as other objects and advantages thereof, will be more clearly understood by reference to the following detailed description of a preferred embodiment thereof, particularly when considered in connection with the accompanying drawing, which:

FIGURE 1 is a perspective view of a pad mounted transformer showing a preferred embodiment of the cable holder of this invention secured thereto;

FIGURE 2 is a perspective view of the preferred cable holder shown in FIGURE 1;

FIGURE 3 is a sectional view taken on the line 3—3 of FIGURE 2; and

FIGURE 4 is a top view of a preferred form of holding member as used with the cable holder of FIGURES 1 through 3.

While this description will set forth the invention as particularly applied to a specific type of transformer, it will be understood that the cable holder of this invention is not strictly limited to such transformer. It will be clear that the cable holder of this invention will find utility in other types of transformers. Therefore, the following is set forth as a description of a preferred form of the invention as applied to a pad mounted transformer but is not to be considered as limiting the invention, which, of course, is only limited in the manner set forth in the appended claims.

Referring first to FIGURE 1 there is shown a portion of a pad mounted transformer, essentially the portion comprising the high voltage compartment of such pad mounted transformer. As will be understood by those skilled in the art, a pad mounted transformer generally comprises a transformer to which has been connected a forward compartment. The forward compartment is normally divided into two parts, one part forming a high voltage compartment while the other part forms a low voltage compartment.

As is shown in FIG. 1, the pad mounted transformer includes a top member 10 and a side member 12 and a front plate 14. These members in general describe the front compartment of the transformer. As is shown, a high voltage compartment is formed by use of an insulating barrier 16 extending from the cover 10 to the lower portion of the transformer and connected to the front plate 14. In some designs barrier 16 may be of metal. A rear wall 18 is also provided, as will be understood, the rear wall generally forming one wall of the transformer. A pair of high votage bushings 20, 22 are provided extending from back wall 18 into the high voltage compartment. As can be seen from FIG. 1, the high voltage compartment is provided with an insulating barrier 24 which extends between the high voltage bushings 20 and 22. As will be well understood the insulating barrier 24 prevents accidental contact with one high voltage bushing while working on the other high voltage bushing. Also it eliminates the possibility of arcing between the bushings when only one of the bushings is energized.

In normal practice the transformer is mounted on a cement pad, which is indicated at 26, and the electrical connection for such transformer are brought from the ground through the pad as indicated at 28 and into the high voltage compartment. High voltage cables, such as 30, come from the opening 28 in the pad 26 to the bushings 20, 22 in the manner shown.

As will be understood, when servicing the transformer it is often desirable to remove or disconnect the high voltage cable 30 from bushings 20 and 22. When such cables have been disconnected it is desirable that the cable be maintained in a disconnected position free from contact with all metal parts and also in a position where it may not be accidentally contacted by the serviceman working on the transformer. In order to enable the holding of cable 30 clear of bushings 20 or 22 after they have been disconnected, a cable holder 32 is provided. Cable holder 32 comprises an insulated member which may be mounted in a slot 34 in the barrier 24 in the high voltage compartment. As is shown, the cable holder 32 is slid into the slot 34 and a pair of depending angle members 36 may be provided which are bolted to the barrier 24, as shown, to firmly secure cable holder 32 in position on barrier 24. As can be seen from FIG. 1, when the high voltage cable 30 is disconnected from the bushing 20 it may be placed into a holder member 38 which forms a portion of the cable holder 32. As can be seen, due to the flexing of cable 30 away from opening 28 and bushing 20, the member 38 will hold the cable in a flexed position, free from the bushing. The cables 30 are relatively thick electrical conductors and will be substantially self-supporting and, therefore, will be held securely in the holder 38, as shown.

The high voltage compartment has been described as provided with the insulating barrier 24 between the high voltage bushings 20, 22. However, it will be understood that in some large transformers, with sufficient distance between the bushings, such barriers are not used. In transformers without a barrier 24, a metal or insulated member may be provided, extending upward from pad 26 or downward from cover 10. The cable holder 32 could be secured to such member in the manner previously described, or as otherwise desired, to provide a cable holder as herein set forth.

Referring now to FIGURES 2 and 3 of the drawing, it may be seen that the cable holder 32 in general comprises a main bar member 40 and on opposite ends of bar member 40 are provided the cable holding members 38. In the center of the bar member 40 the angle members 36 are mounted in the manner shown. As will be understood, all of the parts 36, 38 and 40 are made of an insulating material, such as, for example, a glass reinforced polyester material. Obviously, many types of plastic resinous material may be utilized for the parts of the cable holder. It is only necessary that such parts be of an electrical insulating material. However, as noted, a glass reinforced polyester resinous material has been found very satisfactory due to its rigidity and high electrical insulating characteristics.

Each of the members 36 and 38 is bolted to the bar member 40 by means of insulated screws indicated at 42. Of course, it will be understood that while the cable holder 32 is shown as being fabricated from separate parts, it may be molded into a single member from a glass-reinforced polyester resin or other types of plastic material.

Referring now specifically to FIGURE 4 of the drawing, there is shown a top view of one of the cable support members 38. As is shown, the support member 38 is provided with a slot 44 which angles into a circular portion 46. As will be apparent from the top view of the cable support 38, the cable may be pulled into the slot 44 and moved into the circular portion 46 where the cable will be securely held in a desired position. For example, considering FIGS. 1 and 2 it can be seen that the slots 44 in the support 38 are parallel to the bar member 40 while the portions 46 are angled therefrom toward the bushings 20 and 22. As will be apparent due to the flexibility of the cable 30 when the cable is placed into the circular open portion 46 of the slot in the cable support 38 the cable will tend to move toward the bushing 20 or 22 but will be restrained by means of cable support 38. Due to the flexibility of the cable 30 and the positioning of the slot 44 in the support 38, cable 30 cannot be moved out of the slot in the cable holder 38 accidentally. It will require a positive pulling back from portion 46 and then out through the slot 44 to enable release of the cable 30 from the cable holder 38.

Of course, it will be understood that the cable holder 32 and the support members 38 will be of a length and size so as to provide adequate electrical clearance and support for the particular type of cable which will be used therewith. For large transformers a greater clearance will be necessary from both the bushing 20, 22 and the back wall member 18. The circular portions 46 will be sized to sufficiently hold the size of the cable 30. As will be apparent from the preceding description, the cable holder of this invention may be readily mounted within a transformer and will adequately hold the disconnected high voltage cables clear of all metal parts and in a position so as not to be accidentally contacted by the serviceman working on the transformer.

While there has been shown and described the present preferred embodiment of this invention it will of course be apparent to those skilled in the art that various changes may be made in the various constructional details without departing from the spirit and scope of the invention, particularly as it is set forth in the appended claims.

What is claimed as new and which it is desired to secure by Letters Patent of the United States is:

1. A cable holder for holding a high voltage cable clear of metal parts of a transformer comprising:
  (a) an elongated insulated bar member
  (b) an angle member secured substantially at the midpoint of said bar member and having an extended portion extending from one surface of said bar member, said angle member adapted to be connected to a portion of a transformer;
  (c) and a cable support member at each end of said bar member;
    (1) each said cable support member having an extended portion extending from said bar member in a direction substantially perpendicular to said extended portion of said angle member,
    (2) said extended portion of said cable support member having a slotted opening therein, said slotted opening including an open straight slot portion and a closed rounded portion, said closed rounded portion extending at an angle from said straight slot portion in a direction away from said bar member.

References Cited

UNITED STATES PATENTS

| | | | |
|---|---|---|---|
| 2,712,916 | 7/1955 | Franz | 174—72 X |
| 2,836,215 | 5/1958 | Rapata | 174—40 X |
| 2,913,740 | 11/1959 | Eldridge | 174—135 X |
| 3,197,557 | 7/1965 | Tromsness | 174—170 X |
| 2,839,597 | 6/1958 | Hendrix | 174—146 |
| 3,194,874 | 7/1965 | Husted | 174—146 X |
| 3,271,510 | 9/1966 | Decker et al. | 174—146 |

FOREIGN PATENTS 171,900    12/1921    Great Britain.

LARAMIE E. ASKIN, *Primary Examiner.*